No. 816,385. PATENTED MAR. 27, 1906.
A. A. SCOTT.
METHOD OF TREATING PLASTIC MATERIAL.
APPLICATION FILED OCT. 12, 1905.

No. 816,385. PATENTED MAR. 27, 1906.
A. A. SCOTT.
METHOD OF TREATING PLASTIC MATERIAL.
APPLICATION FILED OCT. 12, 1905.

No. 816,385. PATENTED MAR. 27, 1906.
A. A. SCOTT.
METHOD OF TREATING PLASTIC MATERIAL.
APPLICATION FILED OCT. 12, 1905.

No. 816,385. PATENTED MAR. 27, 1906.
A. A. SCOTT.
METHOD OF TREATING PLASTIC MATERIAL.
APPLICATION FILED OCT. 12, 1905.

UNITED STATES PATENT OFFICE.

ALEXANDER ANDERSON SCOTT, OF KNOXVILLE, TENNESSEE.

METHOD OF TREATING PLASTIC MATERIAL.

No. 816,385.  Specification of Letters Patent.  Patented March 27, 1906.

Application filed October 12, 1905. Serial No. 282,414.

*To all whom it may concern:*

Be it known that I, ALEXANDER ANDERSON SCOTT, a citizen of the United States, residing at Knoxville, in the county of Knox and State of Tennessee, have invented a new and useful Improvement in Methods of Treating Plastic Material, of which the following is a specification, reference being had to the accompanying drawings.
My improvement relates generally to methods of treating clay and analogous plastic material for the manufacture of brick, tile, and analogous artificial products requiring drying under relatively moderate temperature and subsequent "burning" by being subjected to an intense heat; and the improvement relates particularly to the manufacture of such products from what is termed "stiff" clay in the clay-working art, the term "soft" clay being applied to those clays which are so plastic when formed into green bricks that such bricks must be set in single courses for drying, (the plasticity being such that each individual brick would be pressed out of form by the weight of another brick placed upon it,) and the term "dry" being applied to clays from which bricks may be formed sufficiently firm to permit piling or setting in a kiln as high as is ordinarily desired for burning. Approximately seventy-five per cent. of the brick manufactured in this country are made from stiff clays. Throughout this specification the description relates, primarily, to the manufacture of clay products from such stiff clays, and, secondarily, to the manufacture of clay products from such soft clays.

Blocks of clay for the manufacture of brick and analogous products are formed from clay which has been rendered plastic and cohesive by mixing it with enough water to make it moist or wet, and such blocks are said to be "wet" or "green." Before these blocks, so formed, can be burned the water which they contain must be eliminated from them. Heretofore in the manufacture of stiff-clay brick this has usually been done in two steps, the first of said steps being the slow drying at a relatively low temperature—from approximately 100° to 600° Fahrenheit— while the brick are set upon each other in from about five to ten tiers or courses (it being necessary to limit the number of courses because the blocks are plastic and are not able to withstand any considerable pressure without changing shape on account of said pressure) until the plasticity of the bricks is sufficiently reduced to adapt them to resist the downward pressure incident to setting for burning, and the second step being the placing of the bricks into a kiln and after being set as high as is desired for burning subjecting them to a higher drying heat, ranging from 500° to 1,000° Fahrenheit, until the remnant of water not eliminated by the first step of drying has been eliminated. This second step of drying is by some manufacturers called "water-smoking."

In a general way it may be stated that the green brick are subjected to currents of air or other gaseous medium which are capable of taking up moisture from said blocks and carrying said moisture away, whereby the amount of moisture contained by said blocks is gradually more and more reduced. For the sake of convenience in description said air or other gaseous medium may be termed "drying air" or a "drying gaseous" medium. Such capability to absorb and carry away moisture varies to a large extent with the temperature of the gaseous medium, and the rapidity with which said moisture is eliminated from said blocks must vary according to variations in the quality of the clay. For some clays the absorption during the first stages of the drying must be slow in order to avoid checking said blocks. In some instances it is desirable to begin with currents of air which are of low temperature (so that they will absorb slowly) or which are nearly saturated with moisture, so that they can take but little more moisture than they already hold. Some manufacturers perform this first step of drying by exposing the bricks in low piles to the sunlight and to natural currents of air at normal temperature; but according to the prevailing practice said bricks are laid or set on trucks in a limited number of courses and on said trucks put into an inclosure or structure, termed a "drier," and there subjected to currents of air at a relatively low temperature—from approximately 100° to 600° Fahrenheit— until the plasticity of the bricks has been sufficiently reduced to permit setting to the height desired for burning—from about thirty to fifty courses high. Such method is undesirable, because it necessitates expenditure for the construction and maintenance of the driers and requires extra handling of the bricks, and the method is not adapted to the mechanical handling of the brick direct from the machine to the kiln, and because there is loss of heat in transferring the brick from the drier into the kiln.

The object of my invention is to reduce the cost of mechanical equipment, to reduce the handling of the brick, to allow such handling to be to the largest extent mechanical direct from the machine into the kiln, and to avoid such loss of heat in the passing of the brick from the drier into the kiln.

By my improved method the drier is altogether dispensed with, and the bricks are set in the kiln direct from the machine in the green or wet state and are not again moved until they have been both dried and burned.

By way of general description it may be stated that my improved method involves the generating of a stream of said material in the green state and conducting said stream into the kiln, severing the material of said stream into blocks, setting the green or wet blocks in the kiln in a group, belt, or zone to only such height as will avoid crushing the lower of said blocks, then drying said blocks, and thereby rendering them sufficiently firm to support greater pressure from above; then setting upon the group, belt, or zone of blocks thus dried another group, belt, or zone of green blocks; then drying the blocks of said second group, belt, or zone; then setting a third group, belt, or zone of green or wet blocks, upon said second group; then drying said third group, and so on until the total height of all said groups aggregates the height desired for the burning of said blocks.

For the sake of economy the practice of my method may, if so desired, also include the utilization of the heated air, termed "waste heat" in this art, coming from a charged kiln during the cooling period after the charge has been burned, and the products of combustion coming from a charged kiln during the burning period, said heated air or said products of combustion being drawn through suitable ducts into a kiln or compartment of a kiln in which a group of green brick has been set ready for drying.

As to economy it may be noted that by my improved method the saving of labor after the stream of plastic material leaves the machine is fully fifty per cent. Besides this item there is a saving of heat. Furthermore, the cost of mechanical equipment is reduced approximately one-half.

My improved method may be practiced or carried out by various mechanical means. As examples of such means I refer to the apparatus illustrated by the accompanying drawings.

In said drawings, Fig. 16 is a section similar to Fig. 4, showing a different arrangement of the covers for guiding the drying gaseous medium.

Referring to said drawings, 1 is a boiler in which steam is generated to afford power for operating the mechanism involved in the practice of the method. 4 is a steam-engine receiving steam from the boiler 1 through the pipe 3 and transmitting power by a belt 5 to the line-shaft 6.

A machine 9 receives power from said line-shaft by means of a belt 8. Said machine generates a stream 10 of the plastic material in the green state, said stream being expelled through the die or mouthpiece 11, and said stream is carried thence on the conveyer 12 into one of the kiln-chambers A. At any desired point the material of said stream is severed transversely into blocks of the desired size. This may be done by a cutting-machine 13 operating upon said stream. Said conveyer preferably extends through the entire length of said kiln-chamber in order that the stream of plastic material may be conducted uninterruptedly from the machine 9 directly to the places at which the blocks cut from said stream are to be set for drying and burning.

A rotary fan 14 is driven in any suitable manner. In a chamber 16, communicating with said fan, is a heating-coil 16ª, taking steam from the boiler 1 through the pipe 17. An underground duct 18 extends beneath the chamber 16 and opens into the latter between the coil 16ª and the fan-chamber. In the duct 18 is placed a damper 22, which may be closed for cutting off said duct from the chamber 16. Opposite said chamber 16 is an inlet-opening 23, provided with a gate 24. From the fan 14 a flue 25 leads to the underground ducts or flues S, which extend into the kiln-chambers A, and immediately beyond each junction between the duct 25 and one of the ducts S said duct 25 is provided with a damper 26 and said duct S is provided with a damper 27.

Figure 4:
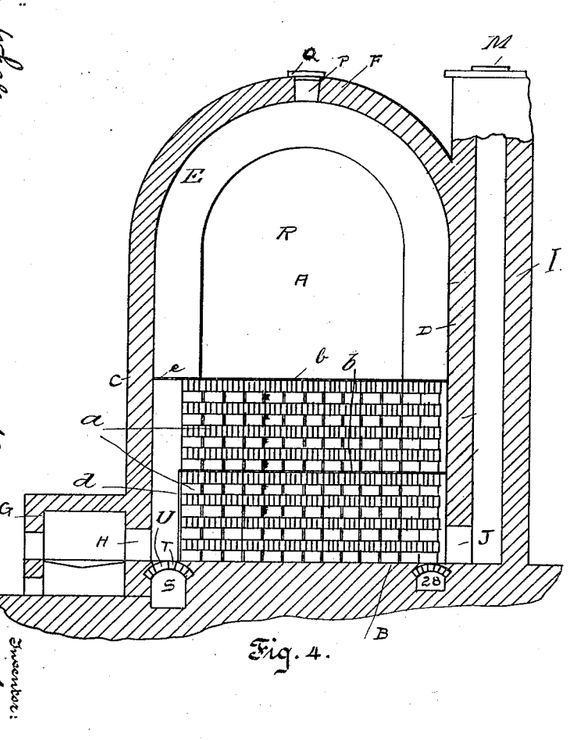
Fig. 4 is a transverse upright section of one-half of one of said kilns on the line 4 4 of Fig. 5.
Figure 4B:
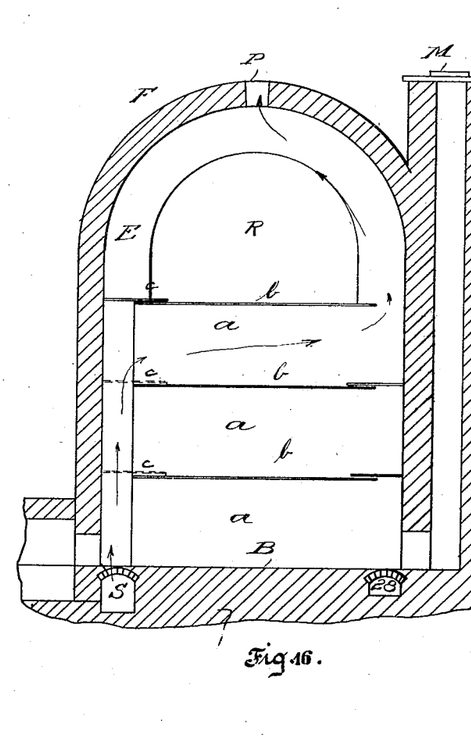
Figure 5:
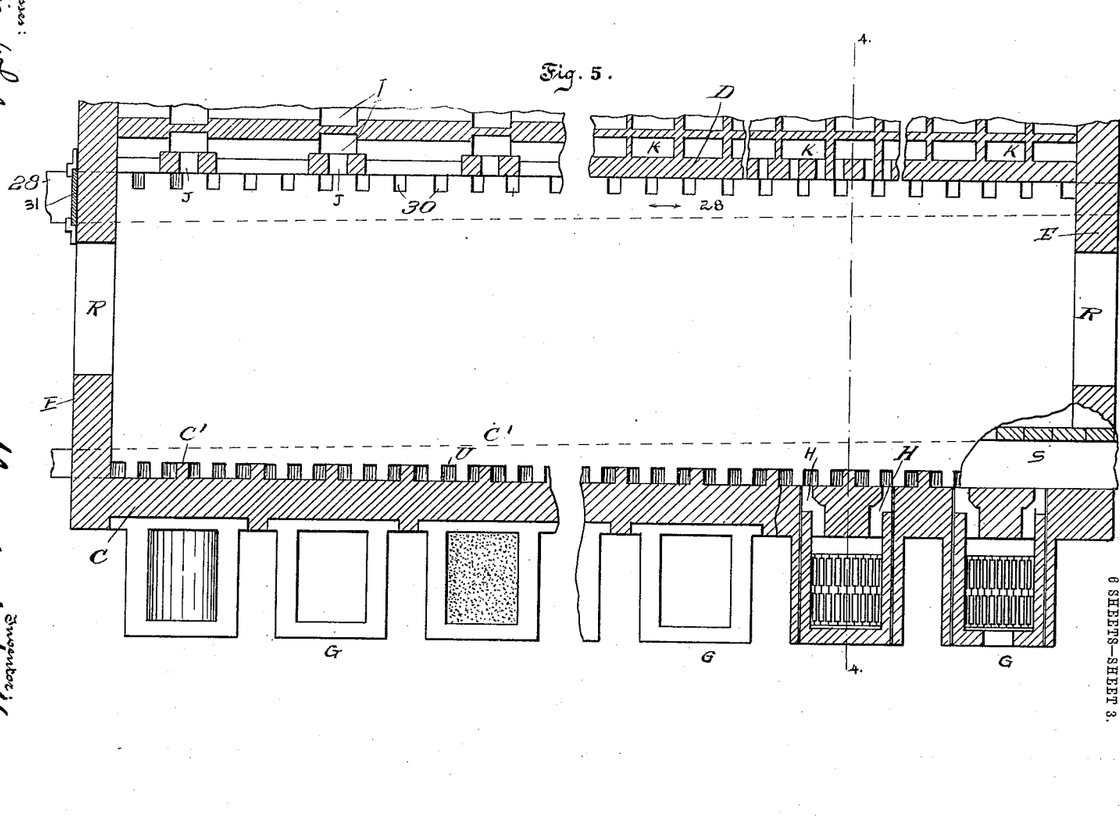
Fig. 5 is a sectional plan of one of the compartments of one of said kilns.
Figure 6:
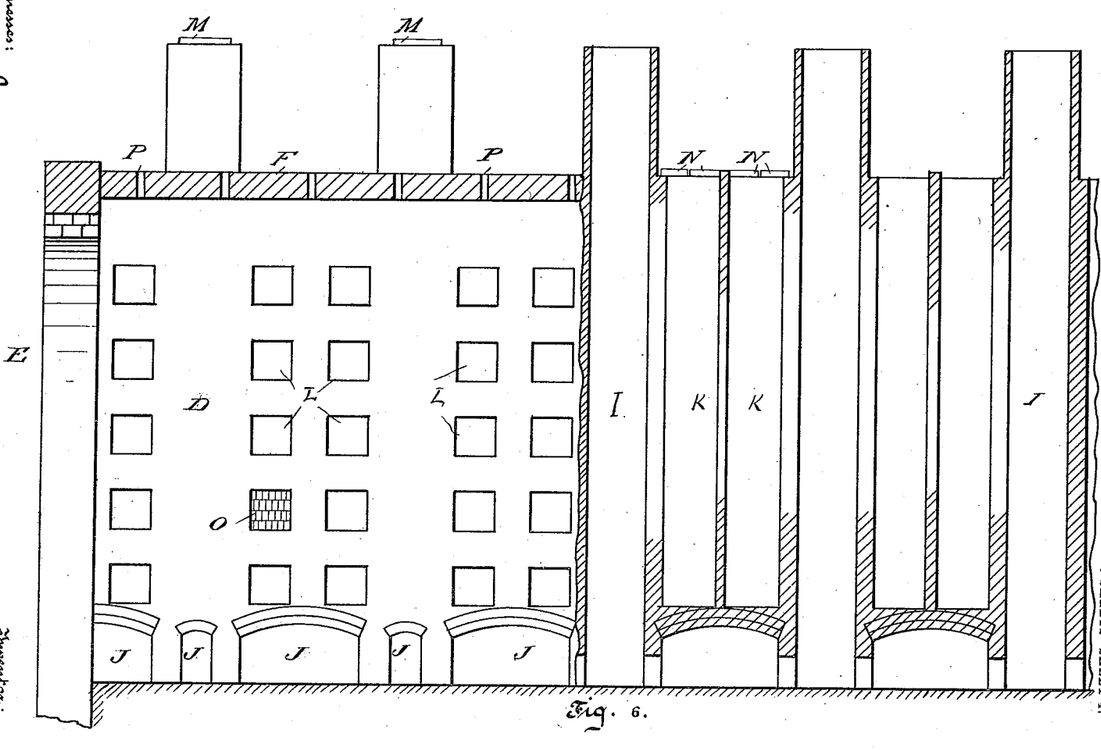
Fig. 6 is an elevation of the right-hand wall of said compartment as shown in Fig. 5, the right-hand portion being sectional.
Figure 7:
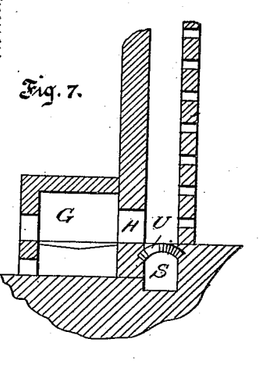
Fig. 7 is an upright sectional detail showing a bag-wall applied to the kiln illustrated by Fig. 4.

Referring now to Figs. 4, 5, and 6, A is a kiln-chamber formed by a floor B, side walls C and D, end walls E E, and an arched crown F. Along the outer side of the base of the lateral wall C are arranged a series of furnaces G, which communicate with said chamber A through flues H. The wall D comprises chimneys or stacks I, open at the top and communicating with the chamber A through a port J at the bottom of the stack. Said wall also comprises a series of flues K, located between the stacks I and communicating with the chamber A through ports L at different elevations. The stacks I may be closed wholly or in part by laying a plate or slab M upon the top of each of said stacks, and the flues K may be similarly rendered inoperative by placing plates or slabs N upon them and also by closing the ports L with suitable plates, dampers, or bricks O. The crown F may be provided with any desired number of ports P, and said ports may be closed at will by means of plates or lids Q. At each end of the kiln access is had to the chamber A through a wicket or door R. Along the base of the lateral wall C the duct S is formed below the level of the floor B and provided with an arch T, having apertures U. Said duct is in communication with the main duct 25, as already described. The apertures U of said duct S may be closed by placing bricks thereon. Beneath the floor-level of each chamber A and adjacent and parallel to the wall D is a duct or flue 28, having floor-openings 30, and the duct 18 extends along the ends of the kilns, and each such flue 28 communicates with said flue 18 through a gate 31.

Figure 10:
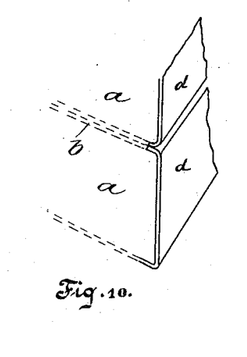
Fig. 10 is a detail end elevation showing the manner of applying the aprons to be hereinafter described.
Figure 11:
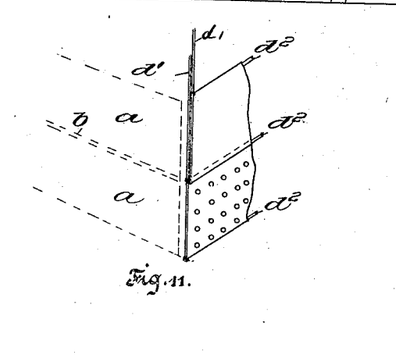
Fig. 11 is a similar detail showing another manner of applying said aprons.

The operation is as follows: The furnaces G being cold and the flues H, leading therefrom into the chamber A, being closed, horizontal tiers of brick $a$ are set upon the floor B just as brick from the drier are ordinarily set in such a kiln preparatory to burning, space being left between the pile of brick and the wall C; but the number of layers is limited, according to the plasticity of said brick. In other words, said brick are set only as high as they would be in a drier—from about five to ten high—if they are of stiff clay in order that the bricks in the lower layers may not be pressed out of shape by the weight of the superposed layers. Now a cover $b$ is placed upon the brick thus piled, said cover extending from one side wall to the other and from one end wall to the other, so that said brick are isolated in a compartment in the lower portion of the chamber A. All of said cover is preferably pliable paper excepting the portion $c$ which extends over the space between the brick and the side wall C, which portion is preferably of rigid paper and may be sheet metal or other rigid material. The said group of bricks being thus isolated by means of said sheet-form material, which is combustible or removable, all the ports L above the cover $b$ are preferably closed. Now the damper 22 being closed and the gate 24 being open, by means of the fan 14 air is drawn through the inlet 23 and the steam-coil in the chamber 16 and driven thence through the duct 25 and the duct S of said chamber A and through the apertures U in the arch T of said duct. On issuing from said apertures the air passes horizontally across the chamber A beneath the cover $b$ and enters the ports J and all the ports L which are located below said cover $b$ and passes thence upward through the flues K and the stacks I into the atmosphere. This portion of the operation is continued until said brick have been sufficiently dried to adapt them to sustain the weight of the additional brick to be set upon them. Then the section $c$ of the cover $b$ is removed and an apron $d$ extended downward from the adjacent edge of the remaining portion of the cover $b$ to the floor B and close to the upright faces of the adjacent brick. By this means the group already dried is isolated from the air issuing from the duct S. Said apron is preferably of paper, and the edges of said apron may be secured in any desired manner. Fig. 10 of the drawings shows said edges held by the lowermost and uppermost brick of the adjacent groups, the lower edge being engaged when the group to which said apron is to be applied is started. Instead of securing the edges of the aprons $d$ as above described said aprons may be suspended by cords $d'$, Fig. 11, suitably fastened above. When this is done, the curtain may be of material other than paper, and bars $d^2$ should be attached to the upper and lower edges of the apron to stretch and give weight to the apron. Now the ports L, which are to be opposite the second group of brick, are opened. Then a group of green or wet brick are set upon the dried or partially-dried first group which is beneath said cover $b$, tier after tier, approximately as high as said first group. Then another cover $b$ is placed over this second group of brick just as the first cover $b$ was placed on said first group, and the cover-section $c$ is so laid as to become a part of the second cover $b$ just as it was a part of the first cover $b$. Then the current of warm air is again driven through the duct S, and, as is obvious from an inspection of the drawings, the warm air will rise between the apron $d$ and the wall C and pass thence horizontally through said second group of brick between said cover $b$ and through adjacent ports L and the flues K. This portion of the operation is continued until the brick of said second group have been sufficiently dried. Then the cover-section $c$ is again removed and a second apron $d$ extended from the adjacent upper edge of said second group of brick downward to or below the upper edge of the first apron $d$, and the ports L between the then uppermost cover $b$ and the plane of the next cover $b$ to be laid are opened. Then another group of brick is set upon the then upper cover $b$ and covered with a cover $b$, comprising the cover-section $c$, and the current of warm air is again driven through said duct and allowed to rise through the passage formed by the wall C on the one side and the aprons $d\ d$ on the other side and moves then horizontally through the third group of brick and through the ports L, which are located between the then uppermost covers $b\ b$, and through the flues K. This portion of the operation is continued until the brick of said third section are sufficiently dried. If there is still room in the upper portion of the chamber A for more brick, additional groups of brick are set in and dried, as already described of the first, second, and third groups. When the kiln has been thus fully charged, the cover-section $c$, (if it is metallic,) the aprons, (if removable,) and the conveyer are removed from the kiln. In closed kilns the cover for the uppermost group may be omitted. If the brick are not completely dried in the successive groups, then for the complete drying of the entire mass of brick air or other gaseous medium may be delivered from the duct S at a higher temperature—from approximately 500° to 1,000° Fahrenheit. If the heat of said air is not sufficient to ignite the paper covers or walls $b$ and aprons $d$, they may be ignited by other means, as by making a temporary fire in one or more of the furnaces G and opening the corresponding flues H, it being desirable to eliminate said aprons and covers in order that the drying-air may move freely through the entire mass of brick. However, if so desired, the covers $b$ may be allowed to remain during the second drying step, the warm air being made to move horizontally through the entire mass; but it may be preferable in some cases to perform the second step of drying by the heat of the gaseous products of the combustion carried on in the furnaces G. Then said step is what is termed in this art "water-smoking." When the latter course is to be pursued, the duct S is closed by closing the damper 27 and the furnaces G opened and moderate fires started in said furnaces, the moderately-heated gaseous products of combustion being directed from said furnaces through the flues H into the chamber A. The covers $b$ and aprons $d$ (if the latter have not been removed) are soon ignited and consumed. Then said products extend through said chamber and the entire mass of brick and pass through the ports J and the stacks I and the ports L and flues K into the atmosphere, or a portion or all of said products and the water-vapor which they take from the brick may be allowed to escape through the crown-ports P. After the brick have been completely dried, whether by warm and hot air alone or by warm air and products of combustion at moderate temperature, and after the flues K have been closed by placing the plates N thereon the entire mass of brick is burned by subjecting it to the high or intense heat of the gaseous products of combustion coming from strong fires in the furnaces G through the flues H, said products passing out of the chamber A through the stacks I alone, or through said stacks and through the crown-ports P, or through the duct 28 when said products are to be used in another chamber A, as will be hereinafter described. The intense heat to which said mass of brick is subjected by the passing of said products of combustion may for the purpose of description be termed a "burning heat."

As a modification of the operation above described the horizontal cover $b$ may be removed after the drying of each group of brick and laid upon the next higher group after the latter has been set into position; but it will probably be preferable in most cases to allow said cover to remain in order that it may prevent the warm air from moving downward from the group of green brick into the dried brick below. It will be observed that when said covers are left in position as the groups of brick are set successively upon each other said covers form horizontal passages to which the movement of the air is confined.

As another modification of the operation as above described the edge of each horizontal cover $b$ adjacent the lateral wall D may be left a short distance from said wall and the ports P in the crown F be left open, Fig. 16. Then the warm air after passing horizontally through the group of green brick will rise between the wall D and the adjacent edge of the upper horizontal cover $b$ and pass out of the chamber A through said crown-ports P. When this course is adopted, the tops of the flues K and I may be closed and the cover $b$ laid close to the wall D on each group after such group has been dried and the aprons $d$ omitted, for when said flues are closed and the covers on the dried groups extend to the wall D there will be no movement of gases through the dried groups even if they are open at the front.

Figures 8, 9, 12:
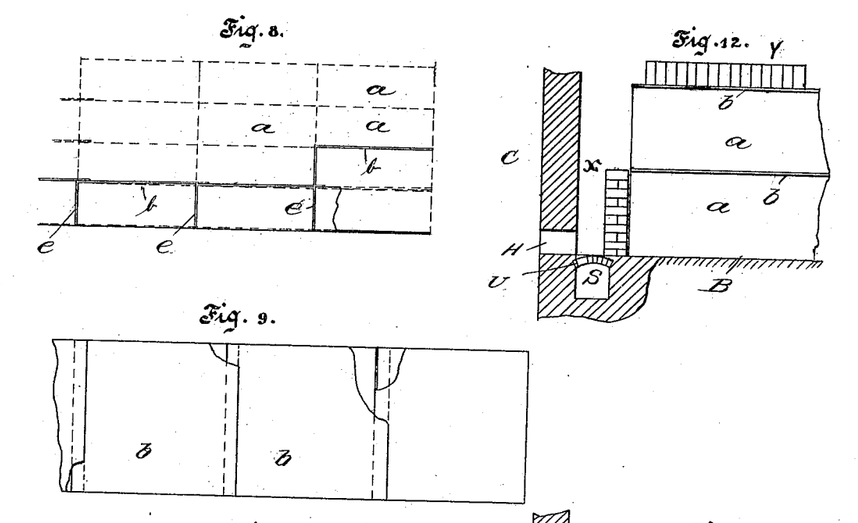
Fig. 8 is a side elevation illustrating the arrangement of groups and group-sections.
Fig. 9 is a plan of the group shown in Fig. 8.
Fig. 12 is a detail sectional elevation illustrating the construction of a bag-wall from the brick constituting the charge or mass of brick being set in the kiln.

As a further modification of said operation upright walls $e$ of sheet-form material may be placed at intervals between the brick constituting a horizontal group in order that the air may be more effectively confined to a transverse movement. (See Figs. 8 and 9.) It will be seen that said walls e divide each group into sections which are located side by side. Said transverse sheet walls may also consist of paper or other combustible material in order that they may be consumed when the furnaces are fired, and by the use of said upright sheet-form partitions or walls e the operation of setting green bricks and drying others may be simultaneously and progressively carried on in the same compartment of the kiln. For example, at one end of the kiln green brick may be set for the forming of a group to extend when completed throughout the length of the kiln, and as soon as enough of said brick are set to form a section of said group a cover b and apron d and a transverse partition-wall e may be put into position to form a compartment to inclose said section and (the duct-apertures U outside of said section being closed) a current of warm air may be made to flow through said section, and while said flow is progressing the setting of said group may be continued until another section is completed and similarly closed, (and the duct-apertures opposite said section opened.) Then the warm air is also made to flow through said section. Thus one section after another may be added to said group and air admitted thereto until said group extends over the entire kiln-floor. Then a second group may be similarly set in sections upon the first group, beginning at the end at which the first group was begun, and after placing an apron d over the front of the first group turning the warm air into each section as the setting and inclosing thereof are completed.

Figure 13:
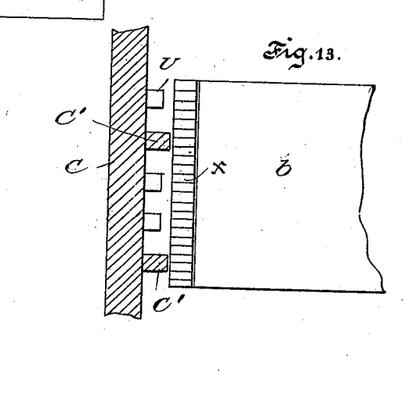
Fig. 13 is a detail plan of the structure shown in Fig. 11.

As a substitute for the aprons d a bag-wall X may be built up between the groups a and the kiln-wall C, (see Figs. 12 and 13,) extra green bricks Y being placed upon each green group a sufficient to build (when dried) in front of said group enough of said bag-wall to cover the adjacent face of said group. By following this method all the dried groups are closed at the front to such extent as may be desired, (the flash-wall may be left more or less open,) while the green group is not covered by the flash-wall and can therefore readily receive the heated gaseous medium rising along the inner face of the wall C. When said flash-wall is used, pilasters C' are preferably placed along the inner face of the wall C to give lateral support to said flash-wall, the openings U above the duct S being placed between said pilasters.

Figures 1, 3:
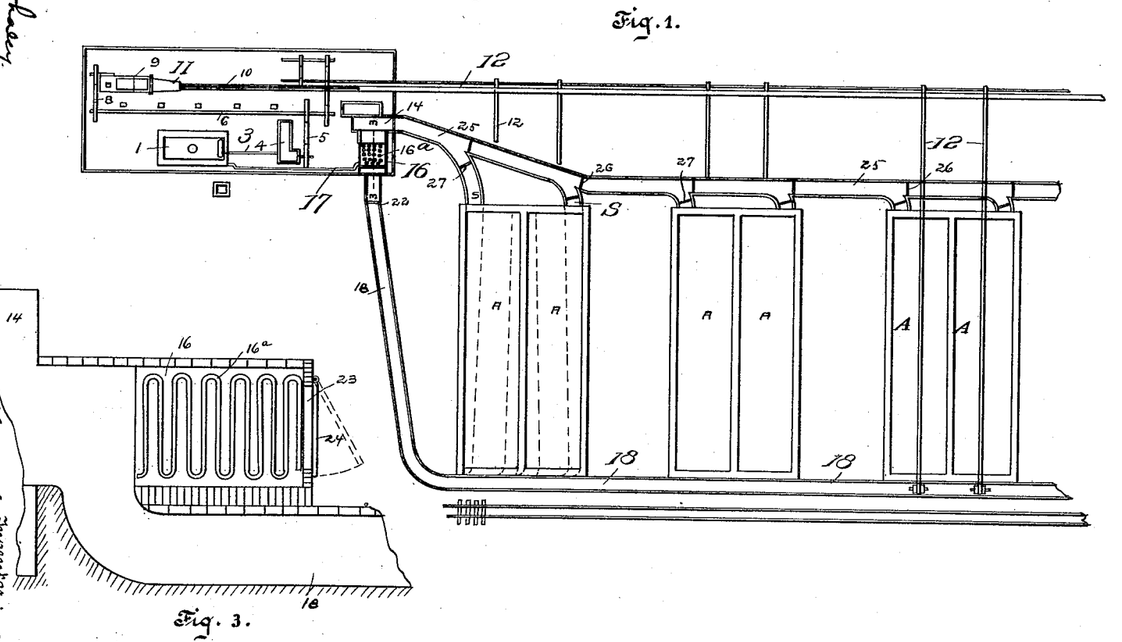
Figure 1 is a general plan of an apparatus comprising three two-compartment kilns and a power-house and appurtenances.
Fig. 3 is a section on the line 3 3 of Fig. 1 looking toward the left.
Figure 2:
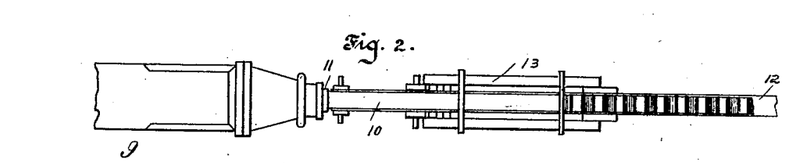
Fig. 2 is a detail plan of the discharge end of the brick-machine and the adjacent portion of the conveyer.

For economical work the setting of green brick should be maintained uninterruptedly. This can be done by conducting the stream of plastic material alternately into two kiln-compartments, setting a group of green brick in one compartment, then subjecting said group to the action of a drying agent, and meanwhile conducting said stream of plastic material into another compartment and there setting another group, then subjecting that group to the action of a drying agent, and again conducting said stream into the first compartment and there setting a second group of brick while said group in the second compartment is being subjected to the drying agent, and so on until the two compartments have been charged, and when two such compartments have been filled with brick and said brick have been dried ready for burning the fires in the furnaces for said compartments may be started and two other compartments may be similarly charged by setting and drying groups of green brick therein alternately, such drying being accomplished by conducting the products of combustion from said first two compartments through each group of green brick in said second two compartments. When the apparatus is in the form illustrated by the drawings, said products of combustion are drawn from said first two compartments into said second two compartments by means of the fan 14. If said first two compartments are the compartments of the kiln at the left in Fig. 1, the products of combustion after passing through the kiln enter the ducts 30 and are drawn thence into the duct 18 and through the latter to the fan, the damper 22 being open and the gate 24 being closed, and from the fan said products pass through the duct 25 to first one and then the other duct S of the middle kiln of Fig. 1, the dampers 27 of the left-hand kiln being closed and the dampers 26 opposite said kiln being open and the dampers 27 and 26 opposite said middle kiln being suitably changed to conform to the alternations of the work in said kiln. When the air heated by the cooling of the mass of burned brick in a compartment is to be used as the drying agent for the green brick being set in another compartment, the furnaces of said compartment containing the burned brick may be left open for the ingress of air and the air entering said doors drawn through the mass of brick in said compartment and delivered to another compartment in which groups of brick are being set and dried by the course taken by the products of combustion last-above described. Ordinarily such heated air-termed "waste heat," thus taken from one compartment is approximately sufficient to dry the brick constituting the charge of another compartment of equal capacity. Hence it will be seen that if a brick plant consists of a considerable number of kiln-compartments—e. g., six or eight—the products of combustion and the waste heat are ordinarily ample for the drying of the green brick. It will be observed that if the plant comprises eight compartments the operation of setting may go on in two of said compartments while the operation of burning goes on in another two compartments, and the operation of cooling goes on in another two compartments, and the operation of removing completed brick is going on in still another two compartments.

As a further modification of said method the brick may be set in the kiln in successive superposed groups without the covers b and the first group subjected to a drying heat by the passing of warm air or other gaseous medium upward through the first group when only the latter has been set, then through the first and second groups after only these have been set, and then through the first, second, and third groups after only these have been set, and so on after each additional group has been set.

Figure 14:
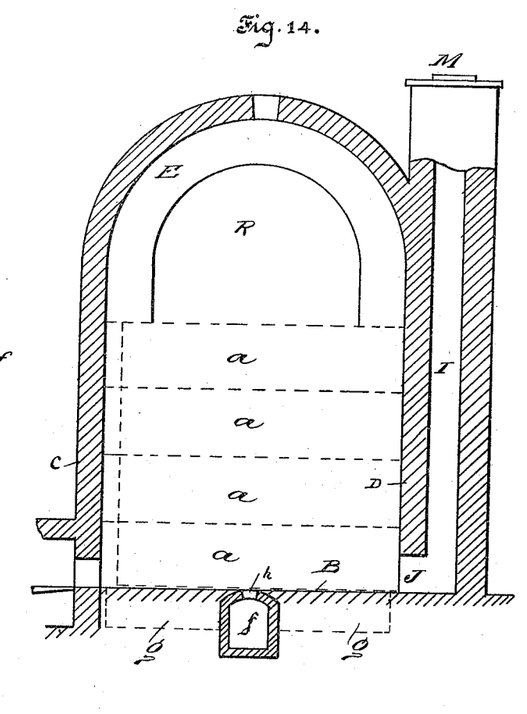
Fig. 14 is a transverse upright section of another form of kiln.
Figure 15:
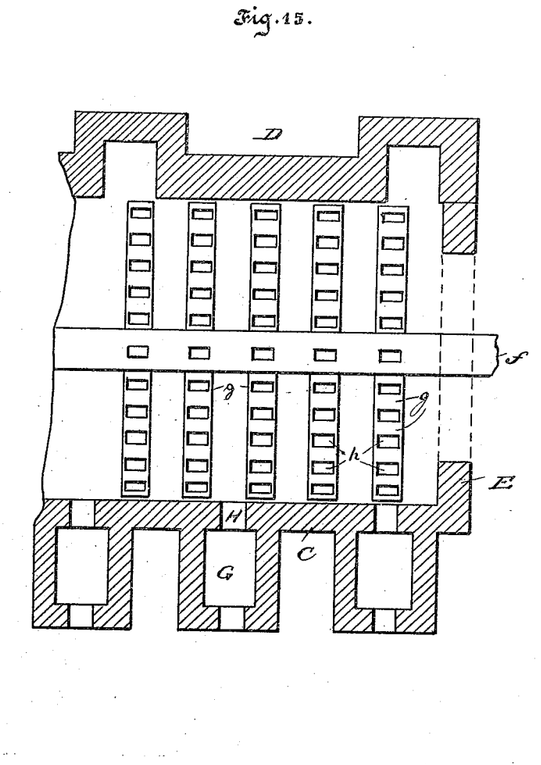
Fig. 15 is a plan of a portion of the same kiln.

A kiln specially adapted for the practice of my improved method thus modified is illustrated by Figs. 14 and 15 of the drawings. In said kiln an air-duct $f$ is located beneath the level of the floor and midway between the side walls C and D and has branches $g$ extending transversely almost to each of said walls C and D. Said duct and its branches have apertures $h$ opening into the chamber A. From this duct and its branches any desired quantity of warm air or similar gaseous medium may be made to rise through a mass of brick located upon the floor of said kiln.

It will be observed that when the method is thus modified the duration of exposure of each group of brick increases from the uppermost downward in arithmetical ratio. If, for example, there are four such groups, the fourth will be subjected to the drying-air during one period, the third will be subjected to the drying-air during two periods, the second during three periods, and the first during four periods. This exposure to warmth, it will be observed, is approximately proportional to the weight which the brick of the several groups must sustain, for the brick of the first group must sustain a portion of the weight of that group plus the three superposed groups, while each of the superposed groups must support one group less than the group next beneath it. Hence by this modification of the method the entire mass of brick may be rendered self-supporting with an aggregate minimum of drying.

While I have illustrated closed kilns, it is to be noted that the method may be practiced in open-top kilns.

I claim as my invention—

1. The herein-described method of treating plastic material, which method consists in forming said material, in the green state, into blocks; then setting said blocks in a plurality of superposed groups; each successive group being subjected to the action of an artificially-moved drying agent before another group is set thereon; and then subjecting the entire mass of said blocks to a high temperature, substantially as and for the purpose herein described.

2. The herein-described method of treating plastic material, which method consists in forming said material, in the green state, into blocks; then setting said blocks in a plurality of superposed groups; each successive group being subjected to the action of an artificially-moved drying agent before another group is set thereon; and then subjecting the entire mass of said blocks to a moving, drying gaseous medium; and then subjecting the entire mass of said blocks to a high temperature, substantially as and for the purpose herein described.

3. The herein-described method of treating plastic material, which method consists in forming said material, in the green state, into blocks; then setting said blocks in a plurality of superposed groups; each successive group being subjected to an artificially-moved, drying gaseous medium before another group is set thereon; and then subjecting the entire mass of said blocks to a gaseous medium of a higher temperature, substantially as and for the purpose herein described.

4. The herein-described method of treating plastic material, which method consists in forming said material, in the green state, into blocks; then setting said blocks in a plurality of superposed groups, each successive group being subjected to an artificially and horizontally moving, drying gaseous medium before another group is set thereon; and then subjecting the entire mass of said blocks to a gaseous medium of a higher temperature, substantially as and for the purpose herein described.

5. The herein-described method of treating plastic material, which method consists in forming said material, in the green state, into blocks; then setting said blocks in a series of group-sections horizontally beside each other to form a group, subjecting each of said sections to the action of an artificially-moved drying agent while an adjacent section is being set, and then superposing additional group-sections of such green blocks upon said first group and subjecting them successively to the action of an artificially-moved drying agent, and then subjecting the entire mass of said blocks to a high temperature, substantially as and for the purpose herein described.

6. The herein-described method of treating plastic material, which method consists in forming said material, in the green state, into blocks; then setting said blocks in a series of group-sections horizontally beside each other, subjecting each of said sections to an artificially-moved, drying gaseous medium while an adjacent group is being set, then superposing additional group-sections of such green blocks upon said first group and subjecting them successively to an artificially-moved drying gaseous medium, and then subjecting the entire mass to an intensely-heated moving gaseous medium, substantially as and for the purpose herein described.

7. The herein-described method of treating plastic material, which method consists in forming said material, in the green state, into blocks; then setting said blocks in a series of group-sections horizontally beside each other, subjecting each of said group-sections to an artificially and horizontally moving, drying gaseous medium while an adjacent section is being set, then superposing additional group-sections of such green blocks upon said first group and subjecting said superposed sections to an artificially and horizontally moving, drying gaseous medium; and then subjecting the entire mass of said blocks to an intensely-heated, moving gaseous medium, substantially as and for the purpose herein described.

8. The herein-described method of treating plastic material, which method consists in forming said material, in the green state, into blocks; then setting a limited group of said blocks in a chamber, then subjecting said blocks to an artificially warmed and moved, drying gaseous medium until they are dried sufficiently to resist downward pressuse; then setting another limited group of wet or green blocks of said material upon the first group of such blocks; then subjecting the blocks of said second group to an artificially-warmed, drying gaseous medium; and then subjecting the entire mass of said blocks to intense heat, substantially as and for the purpose herein described.

9. The herein-described method of treating plastic material, which method consists in forming said material, in the green state, into blocks; then setting a group of said blocks in a chamber and drying said blocks by subjecting them to an artificially warmed and moved, drying gaseous medium; then setting another group of such green blocks upon said first group of blocks and subjecting said group of green blocks to an artificially-warmed, drying gaseous medium; and then subjecting the entire mass of said blocks to intense heat, substantially as and for the purpose herein described.

10. The herein-described method of treating plastic material, which method consists in forming said material, in the green state, into blocks; then successively setting such blocks in a plurality of superposed groups, each successive group being subjected to artificially-moved drying-air before another group is set thereon; then subjecting the entire mass of said blocks to a moving, drying gaseous medium; and then subjecting the entire mass of said blocks to a burning heat, substantially as and for the purpose herein described.

11. The herein-described method of treating plastic material, which method consists in forming said material, in the green state, into blocks; then setting said blocks in a plurality of superposed groups and isolating said groups with combustible sheet-form material and subjecting each successive group to an artificially-moved, drying gaseous medium before another group is set thereon; then eliminating said sheet-form material; and thereafter subjecting the entire mass of said blocks to a heated, gaseous medium, substantially as and for the the purpose herein described.

12. The herein-described method of treating plastic material, which method consists in forming said material, in the green state, into blocks; then setting said blocks in a plurality of superposed groups and isolating said groups with combustible sheet-form material and subjecting each successive group to an artificially-moved, drying gaseous medium before another group is set thereon; then burning said sheet-form material; and thereafter subjecting the entire mass of said blocks to a heated gaseous medium, substantially as and for the purpose herein described.

13. The herein-described method of treating plastic material, which method consists in forming said material, in the green state, into blocks; then setting said blocks in a plurality of superposed groups and isolating each group with combustible sheet-form material, each successive group being subjected to an artificially-moved, drying gaseous medium before another group is placed thereon; then eliminating said sheet-form material; then subjecting the entire mass of said blocks to a higher drying temperature; then subjecting the entire mass to a burning heat, substantially as and for the purpose herein described.

14. The herein-described method of treating plastic material, which method consists in forming said material, in the green state, into blocks; then setting said blocks in a plurality of superposed groups and isolating each group with combustible sheet-form material, each successive group being subjected to an artificially-moved, drying gaseous medium before another group is placed thereon; then burning said sheet-form material; then subjecting the entire mass of said blocks to a higher drying temperature; then subjecting the entire mass to a burning heat, substantially as and for the purpose herein described.

15. The herein-described method of treating plastic material, which method consists in forming said material, in the green state, into blocks; then setting said blocks in a plurality of superposed groups, each successive group being subjected to an artificially-moved drying gaseous medium before another group is set thereon, and then subjecting the entire mass of said blocks to a high temperature, substantially as and for the purpose herein described.

16. The herein-described method of treating plastic material, which method consists in forming said material, in the green state, into blocks; then setting said blocks in a plurality of superposed groups; each successive group being subjected to the action of artificially-moved air at moderate temperature before another group is set thereon; and then subjecting the entire mass of said blocks to a high temperature, substantially as and for the purpose herein described.

17. The herein-described method of treating plastic material, which method consists in forming said material, in the green state, into blocks; then setting said blocks in a plurality of superposed groups, each successive group being subjected to the action of artificially-moved air at moderate temperature; then subjecting the entire mass of said blocks to the action of products of combustion at moderate temperature; and then subjecting the entire mass of said blocks to a high temperature, substantially as and for the purpose herein described.

18. The herein-described method of treating plastic material, which method consists in forming said material, in the green state, into blocks; then setting said blocks in a compartment, in a plurality of superposed groups; each successive group being subjected to the action of an artificially-moved drying agent before another group is set thereon; then subjecting the entire mass of said blocks to the action of highly-heated products of combustion; then, while the last-mentioned step is in progress, setting more of said green blocks in a second compartment, in a plurality of superposed groups, each successive group being subjected to the action of the heated gases conducted from said first-mentioned compartment; and then subjecting the entire mass of said blocks in said second-mentioned compartment to a high temperature, substantially as and for the purpose herein described.

19. The herein-described method of treating plastic material, which method consists in forming said material, in the green state, into blocks; then setting said blocks in a compartment, in a plurality of superposed groups; each successive group being subjected to the action of an artificially-moved drying agent before another group is set thereon; then subjecting the entire mass of said blocks to the action of highly-heated products of combustion; then, while the last-mentioned step is in progress, setting more of said green blocks in a second compartment, in a plurality of superposed groups, each successive group being subjected to the action of the products of combustion conducted from said first-mentioned compartment; and then subjecting the entire mass of said blocks in said second compartment to a high temperature, substantially as and for the purpose herein described.

20. The herein-described method of treating plastic material, which method consists in forming said material, in the green state, into blocks; setting said blocks in a plurality of superposed groups and subjecting each successive group to the action of an artificially-moved drying gaseous medium before another group is set thereon and by stages setting a flash-wall of said dried blocks in front of the groups which have been dried; and then subjecting the entire mass of said blocks to a high temperature, substantially as and for the purpose herein described.

21. The herein-described method of treating plastic material, which method consists in forming said material, in the green state, into blocks; setting said blocks in a plurality of superposed groups and subjecting each group to the action of an artificially-moved drying gaseous medium before another group is set thereon and by stages setting a flash-wall of said dried blocks in front of the groups which have been dried; then subjecting the entire mass of said blocks to the action of a drying gaseous medium; and then subjecting the entire mass of said blocks to a high temperature, substantially as and for the purpose herein described.

22. The herein-described method of treating plastic material, which method consists in forming said material, in the green state, into blocks; then setting said blocks in a plurality of superposed groups and subjecting each successive group to the action of an artificially and horizontally moving drying gaseous medium before another group is set thereon and by stages setting a flash-wall of said dried blocks in front of the groups which have been dried; and then subjecting the entire mass of said blocks to a high temperature, substantially as and for the purpose herein described.

23. The herein-described method of treating plastic material, which method consists in generating a stream of said material, in the green state, severing the material of said stream into blocks and conducting said stream into a compartment; setting said blocks in a plurality of superposed groups and subjecting each successive group to the action of an artificially-moved drying gaseous medium before another group is set thereon and by stages setting a flash-wall of said dried blocks in front of the groups which have been dried; and then subjecting the entire mass of said blocks to a high temperature, substantially as and for the purpose herein described.

24. The herein-described method of treating plastic material, which method consists in generating a stream of said material, in the green state, severing the material of said stream into blocks and conducting said stream into a compartment; setting said blocks in a plurality of superposed groups and subjecting each successive group to the action of an artificially-moved horizontally-moving drying gaseous medium before another group is set thereon and by stages setting a flash-wall of said dried blocks in front of the groups which have been dried; and then subjecting the entire mass of said blocks to a high temperature, substantially as and for the purpose herein described.

25. The herein-described method of treating plastic material, which method consists in generating a stream of said material, in the green state, severing the material of said stream into blocks and conducting said stream into a compartment; setting said blocks within said compartment in a plurality of superposed groups, each successive group being subjected to the action of an artificially-moved drying agent before another group is set thereon; and then subjecting the entire mass of said blocks to a high temperature, substantially as and for the purpose herein described.

26. The herein-described method of treating plastic material, which method consists in generating a stream of said material, in the green state, severing the material of said stream into blocks and conducting said stream into a compartment; setting said blocks within said compartment in a plurality of superposed groups, each successive group being subjected to the action of an artificially and horizontally moving drying agent before another group is set thereon; and then subjecting the entire mass of said blocks to a high temperature, substantially as and for the purpose herein described.

27. The herein-described method of treating plastic material, which method consists in forming said material, in the green state, into blocks; setting said blocks alternately in a plurality of superposed groups in two compartments, each successive group in the same compartment being subjected to the action of an artificially-moved drying agent while a group is being set in the other of said compartments; and then subjecting the entire mass of said blocks in each of said compartments to a high temperature, substantially as and for the purpose herein described.

28. The herein-described method of treating plastic material, which method consists in generating a stream of said material, in the green state, severing the material of said stream into blocks and conducting said stream alternately into two compartments; setting said blocks alternately in a plurality of superposed groups in said compartments, each successive group in the same compartment being subjected to the action of an artificially-moved drying agent while a group is being set in the other of said compartments; and then subjecting the entire mass of said blocks in each of said compartments to a high temperature, substantially as and for the purpose herein described.

29. The herein-described method of treating plastic material, which method consists in subjecting a mass of dried blocks of said material to the action of highly-heated gases in a compartment and allowing said mass to cool; then, while said action is proceeding, setting similar blocks alternately in a plurality of superposed groups in two other compartments, each successive group in the same compartment being subjected to the action of the gases conducted from said first-mentioned compartment; and then subjecting the entire mass of said blocks in said last two compartments to a high temperature, substantially as and for the purpose herein described.

30. The herein-described method of treating plastic material, which method consists in subjecting a mass of dried blocks of said material to the action of highly-heated gases in a compartment and allowing said mass to cool; then, while said action is proceeding, setting similar blocks alternately in a plurality of superposed groups in two other compartments, each successive group in the same compartment being subjected to the action of the gases conducted from said first-mentioned compartment; and then subjecting the entire mass of said blocks in each of said last two compartments to the action of heated gases conducted from another mass of said blocks; and then subjecting the entire mass of said blocks in each of said last two compartments to a high temperature, substantially as and for the purpose herein described.

31. The herein-described method of treating plastic material, which method consists in forming said material, in the green state, into blocks; then setting said blocks in a compartment in a plurality of superposed groups, each successive group being subjected to the action of an artificially-moved drying agent before another group is set thereon; then subjecting the entire mass of said blocks to the action of highly-heated gases and allowing said mass to cool; then, while the last-mentioned step is in progress, setting similar blocks alternately in a plurality of superposed groups in two other compartments, each successive group in the same compartment being subjected to the action of the heated gases conducted from said first-mentioned compartment; and then subjecting the entire mass of said blocks in each of said last-mentioned compartments to a high temperature, substantially as and for the purpose herein described.

32. The herein-described method of treating plastic material, which method consists in subjecting a mass of said material to the action of highly-heated gases in a compartment and allowing the same to cool; then, while said action is proceeding, setting similar blocks alternately in a plurality of superposed groups in two other compartments, each successive group in the same compartment being subjected to the action of the horizontally-moving gases conducted from said first-mentioned compartment; and then subjecting the entire mass of said blocks in said last two compartments to a high temperature, substantially as and for the purpose herein described.

In testimony whereof I have signed my name, in presence of two witnesses, this 7th day of October, in the year 1905.

ALEXANDER ANDERSON SCOTT.

Witnesses:
CYRUS KEHR,
A. A. SCHMID.